United States Patent [19]

Nowak

[11] Patent Number: 4,778,036

[45] Date of Patent: Oct. 18, 1988

[54] CAM-OPERATED MECHANICAL MACHINE BRAKE

[76] Inventor: Florian I. Nowak, Newington, Conn.

[21] Appl. No.: 91,092

[22] Filed: Aug. 31, 1987

[51] Int. Cl.$^4$ ............................................. F16D 63/00
[52] U.S. Cl. .................................... 188/85; 188/77 R; 188/249; 188/250 H; 192/33 R; 192/80
[58] Field of Search ............... 188/77 R, 85, 249, 259; 192/80, 26, 33 R

[56] References Cited

U.S. PATENT DOCUMENTS

| | | | |
|---|---|---|---|
| 8,518 | 12/1878 | Burwell et al. | 192/80 |
| 408,291 | 8/1889 | Bullard. | |
| 1,614,345 | 1/1927 | Conway | 192/80 |
| 1,704,963 | 3/1929 | Brey | 188/259 |
| 2,147,939 | 2/1939 | Tishken | 188/85 X |
| 2,149,940 | 3/1939 | Kylin | 192/2 |
| 2,267,696 | 12/1941 | Groene et al. | 82/2 |
| 3,058,368 | 10/1962 | Wagner | 188/83 X |
| 3,744,353 | 7/1973 | Rohs | 82/2 R |
| 3,756,354 | 9/1973 | Clark | 188/77 R |
| 4,491,044 | 1/1985 | Haas et al. | 82/36 A |

FOREIGN PATENT DOCUMENTS 2122132  1/1984  United Kingdom ............... 188/259

Primary Examiner—George E. A. Halvosa
Attorney, Agent, or Firm—Ira S. Dorman

[57] ABSTRACT

An assembly is provided for intermittently applying braking force to a rotating member of a machine, and for positively effecting the release thereof, to enhance performance and efficiency. The device is purely mechanical in nature, and is particularly adapted for installation on an automatic screw machine to control chatter and backlash while optimizing power utilization.

20 Claims, 4 Drawing Sheets

CAM-OPERATED MECHANICAL MACHINE BRAKE

BACKGROUND OF THE INVENTION

It is common practice to provide means for applying a retarding force to a shaft or other rotating part of a machine, to compensate for looseness caused by wear. Such slack in the power transmission system tends to create "chatter", and to produce inaccuracy when machining operatives are involved. In some instances, for example, as much as two degrees of backlash can result from gear train wear when the working load upon tooling is relieved, and the attendant problems may be particularly acute in those instances in which small tools, which must be handled with considerable delicacy, are involved. Although many different forms of machines suffer from difficulties of this nature, those in which constant and frequent indexing occurs, such as in automatic screw machines, represent specific instances in which it is particularly important to damp spurious movement caused by wear.

As indicated, this has been accomplished in the past by creating a drag upon a shaft of the machine, developed by frictional force that is applied either continuously or intermittently. The former approach is disadvantageous for a number of reasons, including the need that it creates for overpowering of the machine, so as to ensure the availability of sufficient net energy for providing the desired speed and other characteristics of operation; also, there is of course a substantial waste of energy and the generation of excessive amounts of heat.

Other forms of devices apply the retarding force only during the working phase of the cycle, relieving it when indexing is to occur. While offering obvious advantages over constant-drag arrangements, the prior art systems of this type have typically relied upon springs or hydraulic and pneumatic means to effect the dynamic action required; furthermore, they have not been entirely satisfactory in operation, and they have tended to be overly complex and prone to premature failure.

Accordingly, it is the broad object of the present invention to provide a novel automatic brake assembly for intermittently applying braking force to a rotating member, and for relieving such force therefrom.

A more specific object of the invention is to provide such an assembly which is purely mechanical in nature, is highly effective, safe and reliable, and which is of uncomplicated construction, thereby rendering it relatively inexpensive and facile to manufacture.

Another specific object is to provide a device having the foregoing features and advantages, in which the application and the relief of retarding force to the rotating machine component are both effected in a positive manner, and which enhances performance and efficiency of the machine.

A further specific object of the invention is to provide such a device which is constructed to enable facile installation and to avoid interference with other cam-operated attachments, and particularly with attachments on an automatic screw machine.

Yet another object is to provide a novel brake band member which is particularly well-suited for use in such a brake assembly, and which further enhances efficiency and longevity of the mechanism.

SUMMARY OF THE INVENTION

It has now been found that certain of the foregoing and related objects of the invention are readily attained by the provision of an automatic brake assembly, and a machine incorporating it, wherein the assembly includes a brake drum member and a cam member, which are adapted to be adjacently disposed on a rotating member of a machine. A peripheral portion of the cam member provides a continuous cam surface that extends about its axis of rotation, and in the preferred embodiments the cam member will have a return cam element projecting from one side. The assembly also includes a brake band member having a portion adapted to substantially encircle the brake drum member, and on which is provided a cylindrical inside surface for contacting the outside surface of the drum member to apply a braking force. The encircling portion is resiliently deflectable from a relatively relaxed condition to a relatively stressed condition, and it is dimensioned to dispose its inside surface out of substantial contact with the outside surface of the brake drum in the relaxed condition, and to frictionally engage the surface in the stressed condition, to thereby create the braking force. An actuating arm is provided which has force-transmitting means thereon, and which has means for mounting it for pivotable movement about an axis parallel to the axis of rotation of the rotating member, for cooperation with the cam member; means is also provided for operatively connecting the force-transmitting means of the arm to the encircling portion of the brake band member, for effecting its deflection. A first portion of the arm carries a cam follower element, which is adapted for operative engagement with the cam surface of the cam member, and in the preferred embodiments the arm will have a camming surface component which is adapted for operative engagement by the cam element of the cam member. A first portion of the cam surface on the cam member is configured so that, during one phase of the cycle of rotation of the cam member, and acting through the follower element, the force-transmitting means and the connecting means, it positions the actuating arm in a first orientation in which the encircling portion of the brake band member is deflected to its relatively stressed condition. A second portion of the cam surface is configured to position the arm, during another phase of the cycle of rotation, in a second orientation at which the brake band member is in its relatively relaxed condition. When provided, the camming surface component of the actuating arm will be disposed along the path of rotation of the cam element of the cam member, and will be adapted to interengage with it at substantially the same time that the cam follower resides at the point of transition from the first cam surface portion of the cam member to the second portion thereof, thereby serving to effect the positive return of the arm to its first position.

The cam member will usually be of generally plate-like form, with its circumferential edge constituting the cam surfaceproviding peripheral portion. The return cam element may comprise a roller disposed on one side surface of the cam member, for rotation about an axis parallel to the axis of rotation of the machine part acted upon, and the camming surface component on the actuating arm may comprise a substantially planar surface to cooperate therewith. In many applications, the two portions of the cam surface will be of about equal length, to provide proper timing of the braking and release phases.

The brake band member may conveniently be separate from the brake drum member, and adapted for assembly directly adjacent thereto on the same rotating member; in its preferred form, it will be of split-ring construction, with parallel arm portions extending generally tangentially from its free ends. The connecting member employed will desirably be an eyebolt with a head and a shaft, in which case one of the arm portions of the brake band member will have an aperture through which an end portion of the eyebolt shaft extends for affixation to a connecting element on the other arm portion.

The assembly may additionally include a support member which is adapted to be mounted adjacent the rotating member to which the braking force is to be applied, and the support member will desirably have a seat portion which is adapted to support an element of one of the arm portions of the brake band member. The support member may also be adapted to cooperate with the mounting means of the actuating arm to pivotably mount it, as hereinabove indicated, and in its usual form the actuating arm will be elongated, with the mounting means at the juncture between its opposite end portions.

DETAILED DESCRIPTION OF THE ILLUSTRATED EMBODIMENT

Figure 1:
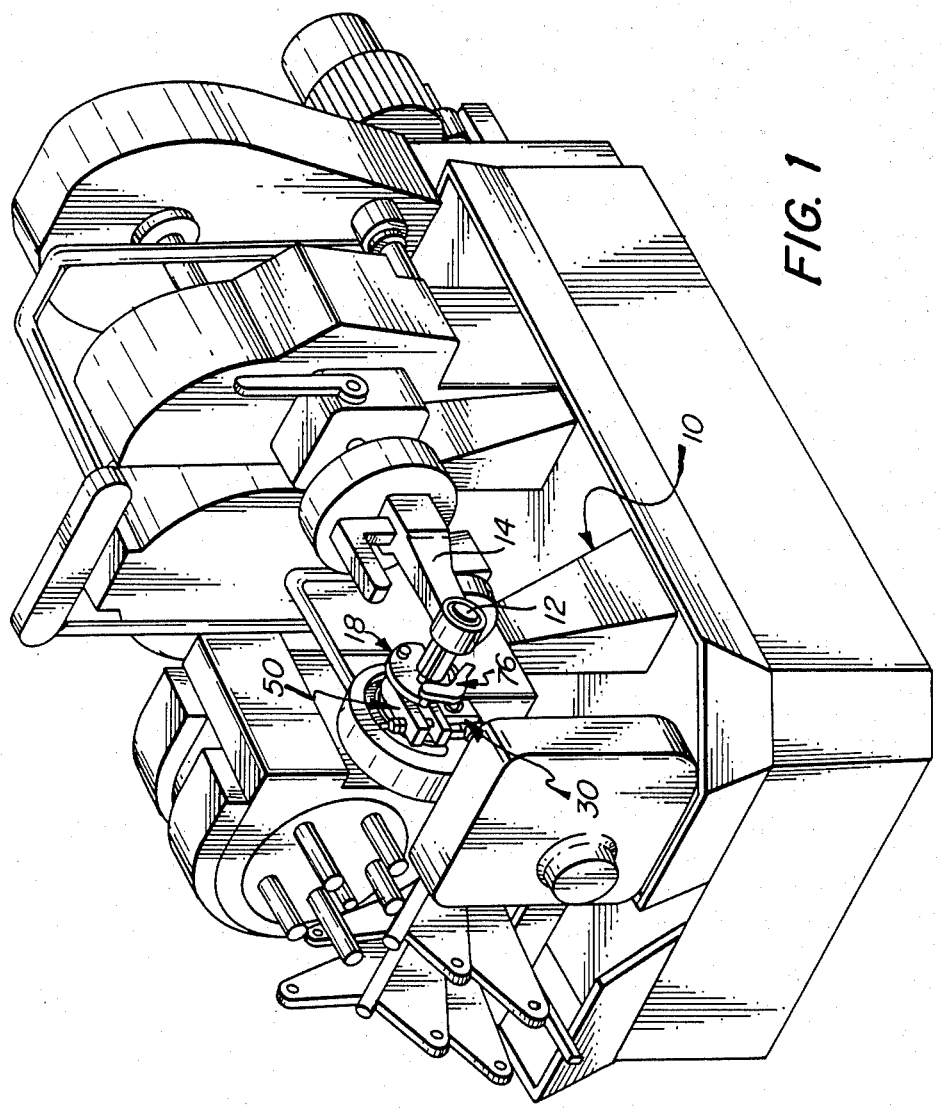
FIG. 1 is a perspective, somewhat schematic view of an automatic screw machine in which a brake assembly embodying the invention is installed.
Figure 2:
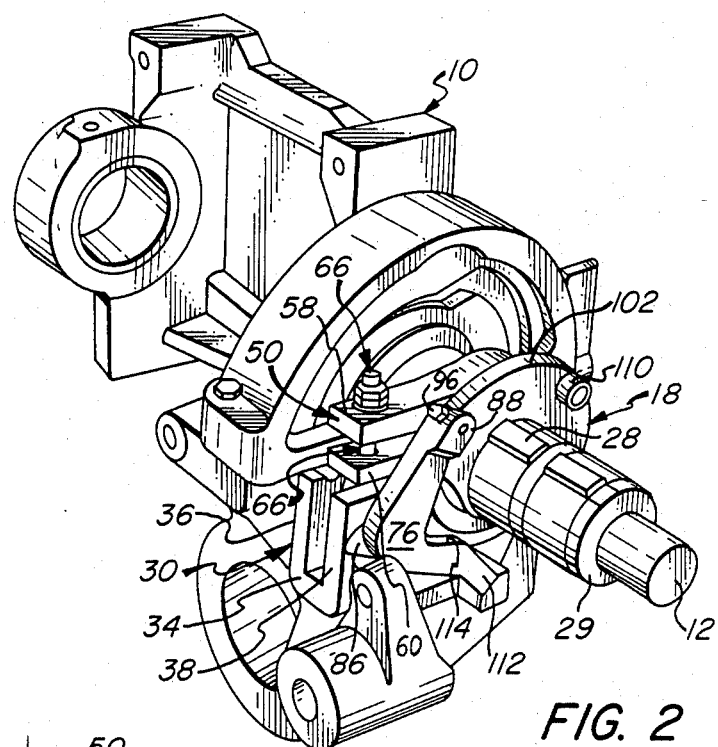
FIG. 2 is a perspective view of the assembly installed on the tool spindle cam shaft of the machine of FIG. 1, drawn to a scale enlarged therefrom.
Figure 3:
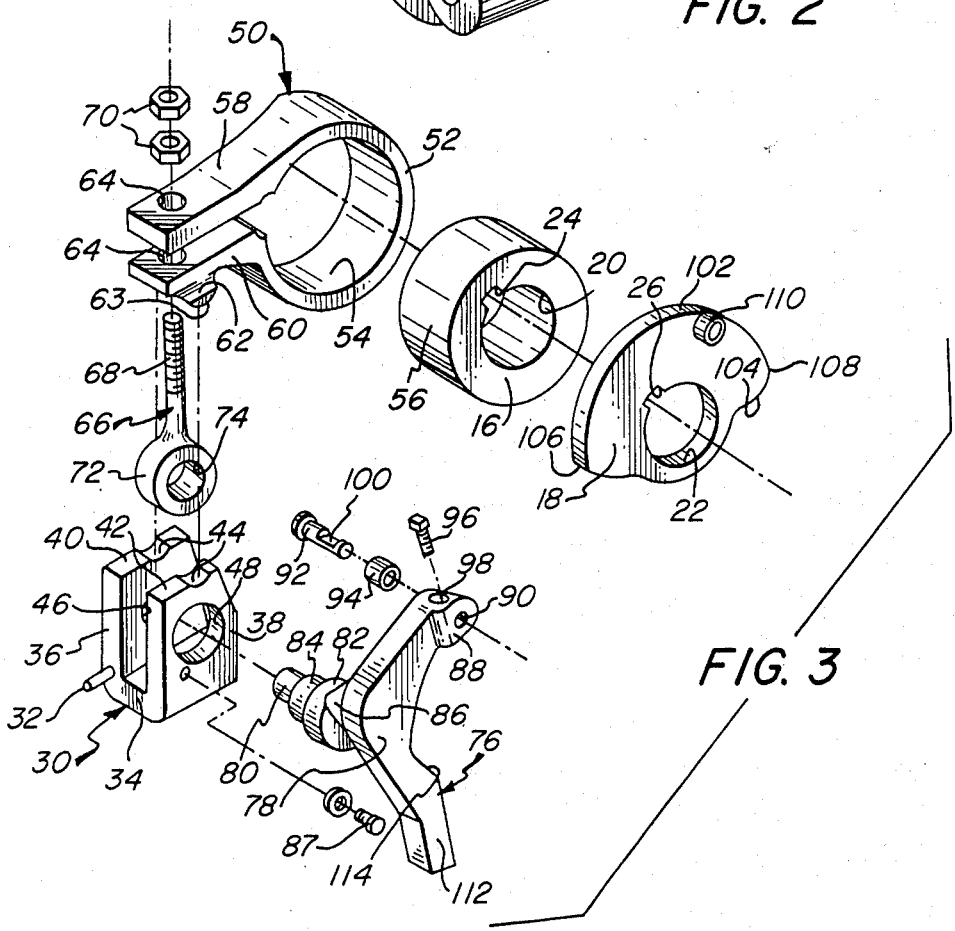
FIG. 3 is an exploded perspective view showing the components of which the assembly is constituted.

Turning now in detail to FIGS. 1-6 of the appended drawings, FIG. 1 depicts the assembly of the invention installed in a schematically illustrated five-spindle automatic screw machine, for which application it is particularly well-adapted; such machines are commercially available from Davenport Machine Tool Co., Inc. of Rochester, N.Y. The frame section of the screw machine in which the device is installed is shown in some detail in FIG. 2, and is generally designated by the numeral 10; it supports the tool spindle cam shaft 12, the outer end of which is journalled within an arm portion 14 of the frame (as seen in FIG. 1).

The rotating components of the brake assembly are mounted upon the cam shaft 12, and consist of a cylindrical brake drum, generally designated by the numeral 16, and a cam plate, generally designated by the numeral 18. The brake drum and cam plate have circular openings, 20, 22, respectively, extending axially through them, along which are formed axial keyways 24, 26. The openings 20, 22 serve of course to permit mounting of the components upon the shaft 12, and the keyways 24, 26 receive the cam shaft key 28, which locks them in fixed angular positions thereupon; retaining ring 29 serves to maintain the parts against axial disassembly from the shaft.

A U-shaped bracket or clevis, generally designated by the numeral 30, is supported upon the frame 10. The surrounding frame structure maintains the clevis 30 in position during forward operation of the machine, even though it is free to "float+ thereon, and a small pin 32 (shown in FIGS. 3-6, but omitted in FIG. 2) driven into a bore formed near the bottom element 34 prevents disassembly of the clevis when the machine is backed up. The upstanding flange portions 36, 38 of the clevis 30 provide shoulders 40, 42, into which indentations 44 are formed. A relatively small circular opening 46 extends through the flange portion 36, and a relatively large opening 48 extends through the flange portion 38 in alignment therewith.

Although not illustrated, it has been found that the provision of structure allowing the clevis to rock slightly, from side-to-side on the supporting surface, is highly desirable from the standpoint of achieving optimal seating. Such structure may advantageously take the form of a pair of semi-cylindrical bosses projecting from the undersurface of the bottom element 34, the bosses being disposed adjacent the opposite ends of the bottom element and aligned coaxially on the centerline between the flange portions 36, 38 of the clevis.

The brake band, generally designated by the numeral 50, includes a cylindrical, split-ring portion 52, which encircles the brake drum 16 with its inner surface 54 closely confronting the surface 56 of the drum; the surfaces 54, 56 are of substantially the same axial dimension, so as to maximize the contact area between them. An upper arm portion 58 extends tangentially from one of the free ends of the split-ring portion 52, and a lower arm portion 60 extends generally parallel to it from the other free end. A rib formation 62, of generally semicircular cross section, extends across the bottom of the lower arm portion 60; its curved surface 63 seats within the semicircular indentations 44 on the shoulders 40, 42 of the clevis 30, to permit limited rocking movement of the brake band 50.

The arm portions 58, 60 have aligned apertures 64 extending through their free ends, which serve to receive the threaded shank portion 68 of an eyebolt connector, generally designated by the numeral 66. The connector 66 is retained against downward disassembly by the two nuts 70 which are threadably engaged upon its shaft portion 68. The circular head portion 72 of the connector 66 is disposed within the space between the upstanding flange portions 36, 38 of the clevis 30, and is positioned with its circular opening 74 in alignment with the openings 46, 48 thereof.

The clevis 30 also serves to pivotably mount an actuating arm, generally designated by the numeral 76. For this purpose, the central portion 78 of the arm 76 has a compound lug structure extending laterally from it, which consists of an outer, relatively small cylindrical element 80, an inner relatively large cylindrical element 82, and an element 84 of intermediate diameter therebetween; the elements 80 and 82 are coaxial, whereas the intermediate element 84 is eccentrically disposed with respect to the axis between them. The outside diameters of elements 80, 82 and 84 are substantially the same as the diameters of the openings 46, 48 and 74, respectively; thus, the arm 76 is pivotably supported by the clevis 30, with the eccentric element 84 rotatably engaging the head portion 72 of the connector 66. The flange 86 on the arm bears upon the surface surrounding the opening 48, and the head of the screw 87 (engaged in the side of the clevis) bears upon the face of the element 82, to prevent inadvertent disassembly.

The actuating arm 76 has a slightly enlarged head portion 88 at its upper end, through which extends a transverse bore 90. A headed pin 92 is inserted into the bore 90, and through the passage of a small cylindrical roller 94; it is retained within the head portion 88 by a screw 96, which is threaded into aperture 98, perpendicular to the bore 90, with its lower end engaged within the small slot 100 formed into the surface of the shank of the pin 92, to securely but removably mount the roller 94 upon the actuating arm 76.

With the arm 76 mounted upon the support bracket 30, the roller 94 is disposed in the transaxial plane of the cam plate 18 and is positioned to ride upon the circumferential edge thereof. The latter provides a camming surface comprised of a maximum dimension constant radius portion 102, a reduced radii portion 104 of varying curvature, and lobes 106, 108 at the points of transition between the portions 102 and 104. The cam plate 18 also has a roller 110 projecting axially from one face, which is disposed to engage the substantially planar surface 114 adjacent the tail portion 112 of the actuating arm 76.

Figure 4:
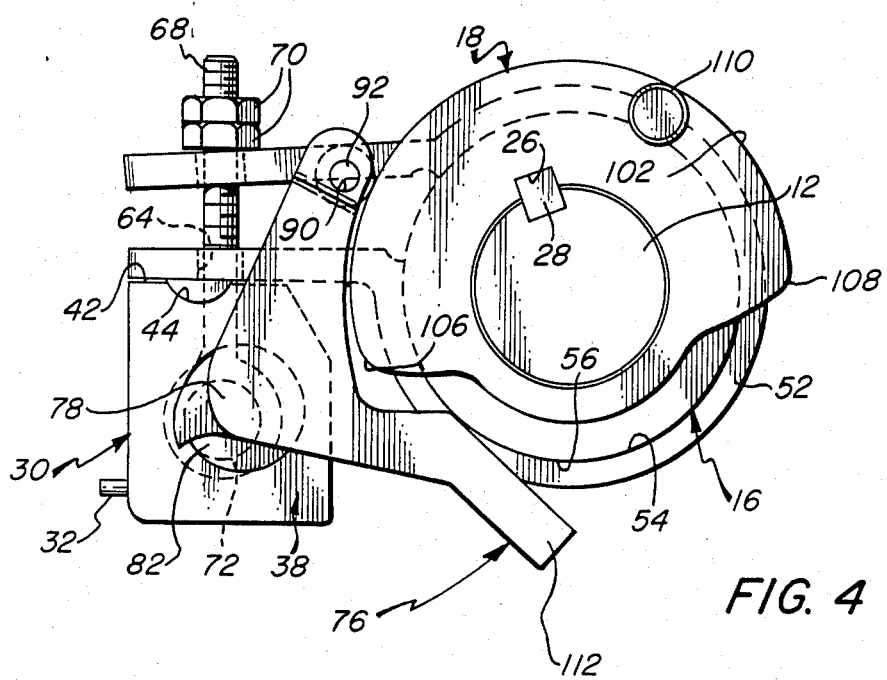
FIG. 4 is an elevational view showing the actuating arm pivoted by the cam plate to deflect the brake band member so as to apply frictional force to the brake drum member.
Figure 5:
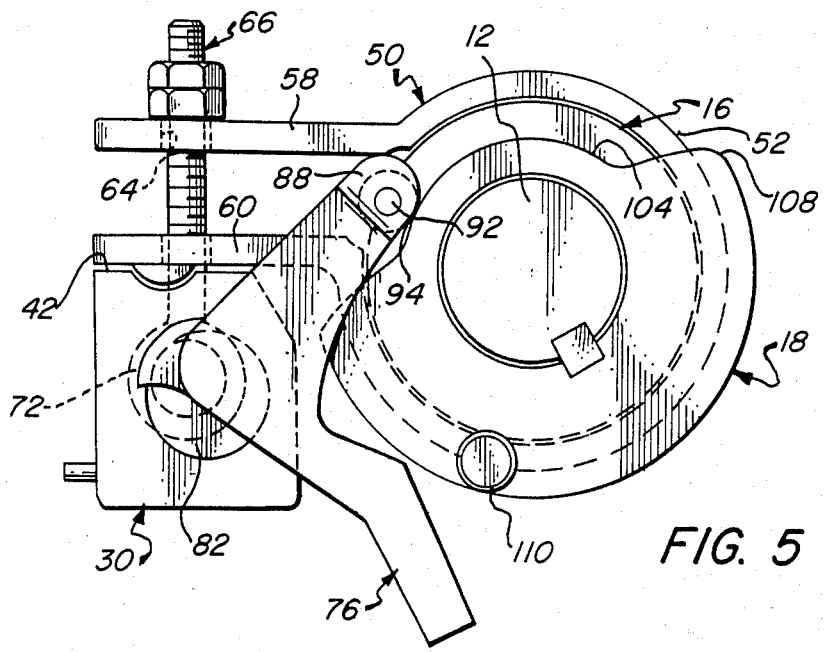
FIG. 5 is a view similar to FIG. 4, showing the cam plate rotated so as to shift the arm to a position at which force upon the brake band member is relieved.
Figure 6:
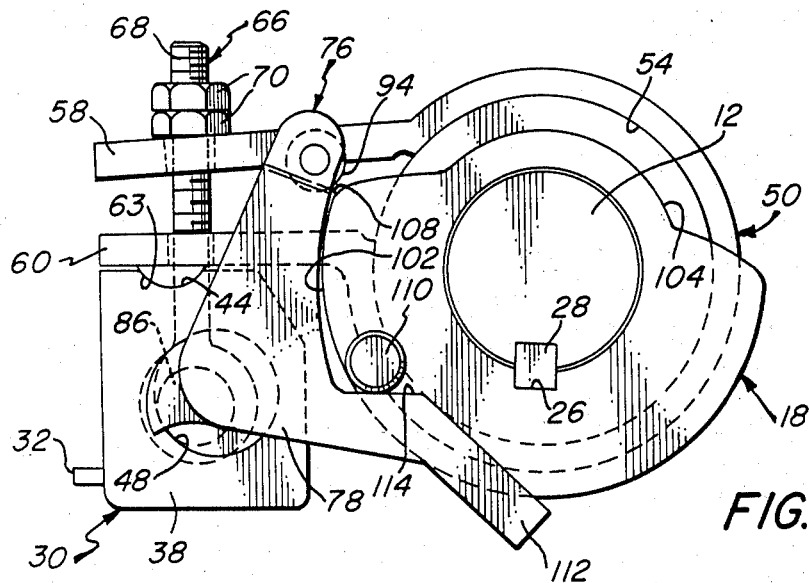
FIG. 6 is a view similar to FIGS. 4 and 5 showing the cam plate rotated so as to position the cam follower of the actuating arm at the point of transition between the portions of the camming surface, also showing the return cam element on the plate entering the cooperating cam surface on the arm.

Operation of the brake is most readily understood with reference to FIGS. 4-6. In FIG. 4, the tool spindle cam shaft 12 is at an angular orientation in which the actuating arm 76 is pivoted to its extreme counterclockwise position (as viewed in the Figure), due to contact of the follower roller 94 upon the constant radius portion 102 of the camming plate 18. The eccentric relationship of the intermediate lug element 84 to the axis of pivoting of the arm 76 causes it to exert a downward force upon the eyebolt 66, acting on the upper arm portion 58 of the brake band 50 to squeeze it toward the restrained arm portion 60, thus bringing the inner surface 54 of the split-ring portion 52 into tight frictional engagement with the outer surface 56 of the brake drum 16, and in turn producing a retarding effect upon the tool spindle cam shaft 12. The angular position and length of the camming surface portion 102 will normally be such as to time the application and release of braking force to commence just ahead of the working phase of the machine operating cycle, and to continue therethrough and for a short period thereafter.

As shown in FIG. 5, the shaft 12 has been rotated to a position in which the follower roller 94 rides on the reduced radii portion 104 of the cam plate periphery, thereby permitting the actuating arm 76 to pivot in a clockwise direction, thus elevating the eyebolt 66 and relieving the force upon the brake band upper arm portion 58. This in turn creates sufficient spacing between the confronting surfaces 54, 56 to remove the drag force, and in normal operation of the timing would be such as to cause this condition to exist during indexing phases of machine operation.

In FIG. 6, the follower roller 94 is positioned over the cam lobe 108, just prior to its descent to the camming surface portion 104, and the return follower roller 110 has engaged the planar surface 114 in the actuating arm 76. Consequently, as the cam profile of the plate 18 allows pivoting of the actuating arm 76 to the force-relieving relationship, the return roller 110 shifts the arm to that position as the cam plate continues to rotate. This of course positively ensures that the braking effect upon the machine transmission gearing will be relieved, without reliance upon springs or other auxiliary means for effecting the return of the arm.

It will be noted that the tail portion 112 is of sufficient length to extend beyond the path circumscribed by the roller 110. In some instances it is of course necessary to back up the machine, causing the cam shaft 12 to turn in the direction reverse to that of normal operation. Were the tail portion 112 of insufficient length, the the roller 110 might pass behind the arm 76 rather than in front of it, which would of course present a risk of serious damage to the machine and harm to personnel.

Figure 7:
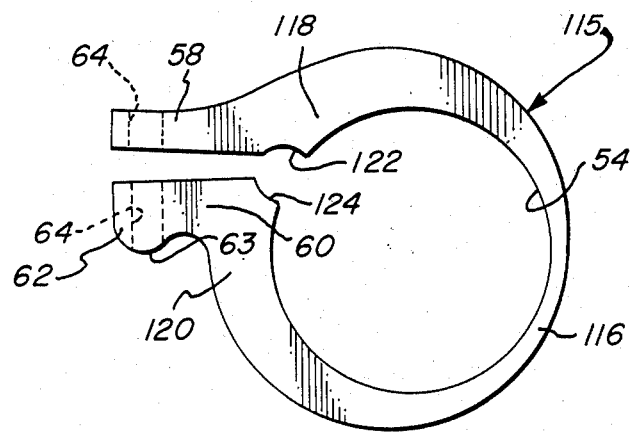
FIG. 7 is a side elevational view of a preferred form of the brake band utilized in the assembly, drawn to a scale enlarged from that of FIG. 3.

Turning finally to FIG. 7, illustrated therein is a preferred form of the brake band, adapted for use in the assembly in place of component 50 and generally designated by the numeral 115. Its construction is similar to that of brake band 50 (and, to the extent that the elements are the same they have been given the same numbers), the difference residing in the provision of an encircling portion which decreases progressively in thickness from the relatively heavy sections 118, 120, adjacent the arm portions 58, 60, to the light section 116. As will be noted, the light section 116 is disposed diametrically with respect to the split in the ring, as defined by the semicircular, laterally extending indentations 122, 124, and it provides a flexure section which, in a working embodiment, may extend through an arc of about 45°-50°.

It has been found that a brake band of uniform thickness tends to bind at an initial contact location, resulting in less than optimal effectiveness and undue wear. The construction of member 115 affords a kind of hinging action, with the two rigid sections moving toward and away from one another about the flexure section 116, thereby counteracting the above-mentioned undesirable features. Thus, the flexure section serves to ensure that the gripping force will be applied uniformly, and with maximum contact of the surface 54 upon the drum surface 56.

It should be understood that this preferred form of brake band need not have a progressively thinning structure, and could instead have a more abrupt change in cross section at the diametrical portion. Also, it will be appreciated that the concept is applicable to components that are designed for uses other than in the machine brake device of the invention, and may for example be employed for automatic transmission bands, and the like.

It will be self-evident to those skilled in the art that the components of the assembly of the invention will normally be made of suitable metals, the choice of which will be apparent. Depending upon the particular application for which the device is intended, however, the materials of construction may vary, as may the specific form of the components of which the assembly is comprised.

Thus, it can be seen that the present invention provides a novel automatic brake assembly for intermittently applying braking force to a rotating member, and for relieving such force therefrom. The assembly is purely mechanical in nature, is highly effective, safe and reliable, and is of uncomplicated construction, thereby rendering it relatively inexpensive and facile to manufacture. Operation of the device of the invention causes both the application and also the relief of retarding force to be effected in a positive manner, and it is so constructed to enable facile installation without presenting interference to other cam-operated attachments of the kind that are typically used on automatic screw machines. Finally, the invention provides a novel brake band construction which is especially well-suited for use in the device of the invention, and which affords enhanced operational efficiency and reduced wear characteristics.

Having thus described the invention, what is claimed is:

1. An automatic brake assembly for intermittently applying braking force to a rotating member, and for relieving such force therefrom, comprising: a brake drum member and a cam member adapted to be adjacently disposed on a rotating member for rotation therewith, said cam member having a peripheral portion providing a continuous camming surface extending about its axis of rotation, and having a return cam element projecting from one side thereof; a brake band member having an encircling portion adapted to substantially encircle said brake drum member, with a cylindrical inside surface for contacting the outside surface of said drum member to apply a braking force thereto, said encircling portion being resiliently deflectable from a relatively relaxed condition to a stressed condition, and being dimensioned to dispose said inside surface out of substantial contact with said outside surface in said relaxed condition and to frictionally engage said outside surface in said stressed condition to apply braking force thereto; an actuating arm having means for mounting it for pivotal movement about an axis parallel to said axis of rotation for cooperation with said cam member, and having force-transmitting means thereon, said arm also having a first portion, and a cam follower element carried thereon and adapted for operative engagement with said camming surface of said cam member when so mounted, and having a camming surface component adapted for operative engagement by said return cam element of said cam member; and means for operatively connecting said force-transmitting means of said arm to said encircling portion of said brake band member for effecting deflection thereof, said camming surface having a first portion configured to position said arm, acting through said follower element, said force-transmitting means and said connecting means, in a first orientation during one phase of the cycle of rotation of said cam member, to deflect said encircling portion of said brake band member to said relatively stressed condition, and having a second portion configured to position said arm, during another phase of the cycle of rotation of said cam member, in a second orientation at which said brake band member is in said relatively relaxed condition, said camming surface component of said actuating arm being disposed along the path of rotation of said return cam element of said cam member, and being adapted to interengage therewith at substantially the same time that said cam follower resides at the point of transition from said first camming surface portion of said cam member to said second portion thereof, to effect the positive return of said arm to said first position thereof.

2. The assembly of claim 1 wherein said cam member is of generally plate-like form, with the circumferential edge thereof constituting said camming surface-providing peripheral portion.

3. The assembly of claim 1 wherein each of said first and second portions of said camming surface constitutes about half of the length thereof.

4. The assembly of claim 1 wherein said brake drum member and said cam member are separate pieces adapted for assembly on the same rotating member directly adjacent to one another.

5. The assembly of claim 1 wherein said encircling portion of said brake band member is of split-ring form with adjacent free ends, and wherein said brake band member has a connecting element thereon adapted for connection of said connecting means thereto.

6. The assembly of claim 5 wherein said brake band member includes an arm portion that extends from one of said free ends of said encircling portion and generally tangentially thereto, said arm portion having a free outer end adjacent to which said connecting element is disposed.

7. The assembly of claim 6 wherein said brake band member has a second arm portion extending from the other of said free ends generally parallel to said first-mentioned arm portion, said second arm portion having an element thereon which is adapted for supporting said brake band member in a substantially fixed position against rotation about said first-mentioned axis under the influence of braking force applied to said connecting means.

8. The assembly of claim 7 wherein said force-transmitting means on said actuating arm comprises a cylindrical element eccentrically disposed on said parallel axis of pivotal movement, wherein said connecting means includes an eyebolt having a head with an opening therethrough, the diameter of said opening being substantially the same as the outside diameter of said cylindrical element to permit operative engagement of said connecting member therewith, said eyebolt also having a shaft extending from said head, and wherein said second arm portion of said brake band member has an aperture through which an end portion of said eyebolt shaft extends, said end portion being affixed to said connecting element of said first-mentioned arm portion.

9. The assembly of claim 8 additionally including a support member adapted to be mounted adjacent the rotating member, said support member having a seat portion that is adapted to so support said supporting element of said second arm portion of said brake band member.

10. The assembly of claim 9 wherein said support member is also adapted to cooperate with said mounting means of said actuating arm to so mount said arm.

11. The assembly of claim 1 wherein said force-transmitting means on said actuating arm comprises a cylindrical element eccentrically disposed on said parallel axis of pivotal movement, and wherein said connecting means includes a connecting member having a first portion with a circular opening therein, the diameter of said opening being substantially the same as the outside diameter of said cylindrical element to permit operative engagement of said connecting member therewith.

12. The assembly of claim 11 wherein said connecting member is an eyebolt having a head with an opening therethrough, providing said connecting member's first portion, and having a shaft extending from said head.

13. The assembly of claim 1 wherein said actuating arm is elongated and has said first portion at one end, said arm having a second portion at the other end thereof joined to said first portion and having said mounting means at the juncture of said first and second portions.

14. The assembly of claim 13 wherein said second portion of said arm extends generally tangentially of and outwardly beyond said path circumscribed by said return cam element as said cam member rotates.

15. An automatic brake assembly for intermittently applying braking force to a rotating member, and for relieving such force therefrom, comprising: a brake drum member and a cam member adapted to be adjacently disposed on a rotating member for rotation therewith, said cam member having a peripheral portion providing a continuous camming surface extending about its axis of rotation, and having a return cam element projecting from one side thereof; a brake band member having an encircling portion adapted to substantially encircle said brake drum member, with a cylindrical inside surface for contacting the outside surface of said drum member to apply a braking force thereto, said encircling portion being resiliently deflectable from a relatively relaxed condition to a stressed condition, and being dimensioned to dispose said inside surface out of substantial contact with said outside surface in said relaxed condition and to frictionally engage said outside surface in said stressed condition to apply braking force thereto; an actuating arm having means for mounting it for pivotal movement about an axis parallel to said axis of rotation for cooperation with said cam member, and having force-transmitting means thereon, said arm also having a first portion, and a cam follower element carried thereon and adapted for operative engagement with said camming surface of said cam member when so mounted, and having a camming surface component adapted for operative engagement by said return cam element of said cam member; and means for operatively connecting said force-transmitting means of said arm to said encircling portion of said brake band member for effecting deflection thereof, said camming surface having a first portion configured to position said arm, acting through said follower element, said force-transmitting means and said connecting means, in a first orientation during one phase of the cycle of rotation of said cam member, to deflect said encircling portion of said brake band member to said relatively stressed condition, and having a second portion configured to position said arm, during another phase of the cycle of rotation of said cam member, in a second orientation at which said brake band member is in said relatively relaxed condition, said camming surface component of said actuating arm being disposed along the path of rotation of said return cam element of said cam member, and being adapted to interengage therewith at substantially the same time that said cam follower resides at the point of transition from said first camming surface portion of said cam member to said second portion thereof, to effect the positive return of said arm to said first position thereof, said cam member being of generally plate-like form, with the circumferential edge thereof constituting said camming surface-providing peripheral portion, said return cam element comprising a roller disposed against one face of said cam member for rotation about an axis parallel to said first-mentioned axis of rotation, and said camming surface component on said actuating arm comprising a substantially planar surface spaced from said cam follower element provided thereon.

16. An automatic brake assembly for intermittently applying braking force to a rotating member, and for relieving such force therefrom, comprising: a brake drum member and a cam member adapted to be adjacently disposed on a rotating member for rotation therewith, said cam member having a peripheral portion providing a continuous camming surface extending about its axis of rotation, and having a return cam element projecting from one side thereof; a brake band member having an encircling portion adapted to substantially encircle said brake drum member, with a cylindrical inside surface for contacting the outside surface of said drum member to apply a braking force thereto, said encircling portion being of split-ring form with adjacent free ends, being resiliently deflectable from a relatively relaxed condition to a stressed condition, and being dimensioned to dispose said inside surface out of substantial contact with said outside surface in said relaxed condition and to frictionally engage said outside surface in said stressed condition to apply braking force thereto, said brake band member also including a first arm portion that extends from one of said free ends of said encircling portion and generally tangentially thereto, said first arm portion having a free outer end, and a second arm portion extending from the other of said free ends generally parallel to said first arm portion, said second arm portion having an element thereon which is adapted for supporting said brake band member in a substantially fixed position against rotation about said first-mentioned axis; an actuating arm having means for mounting it for pivotal movement about an axis parallel to said axis of rotation for cooperation with said cam member, and having force-transmitting means thereon, said arm also having a first portion, and a cam follower element carried thereon and adapted for operative engagement with said camming surface of said cam member when so mounted, and having a camming surface component adapted for operative engagement by said return cam element of said cam member; means for operatively connecting said force-transmitting means of said arm to said encircling portion of said brake band member for effecting deflection thereof, said first arm portion of said brake band member having a connecting element thereon, adjacent said free outer end thereof, adapted for connection of said connecting means thereto, said camming surface having a first portion configured to position said arm, acting through said follower element, said force-transmitting means and said connecting means, in a first orientation during one phase of the cycle of rotation of said cam member, to deflect said encircling portion of said brake band member to said relatively stressed condition, and having a second portion configured to position said arm, during another phase of the cycle of rotation of said cam member, in a second orientation at which said brake band member is in said relatively relaxed condition, said camming surface component of said actuating arm being disposed along the path of rotation of said return cam element of said cam member, and being adapted to interengage therewith at substantially the same time that said cam follower resides at the point of transition from said first camming surface portion of said cam member to said second portion thereof, to effect the positive return of said arm to said first position thereof; and a support member adapted to be mounted adjacent the rotating member, said support member having a seat portion that is adapted to so support said supporting element of said second arm portion of said brake band member, said supporting element having a surface portion of circular cross section and being so disposed on said second arm portion as to be downwardly directed with said brake band member in its normal operating position, and said seat portion of said support member having at least one circular indentation therein adapted to engage said surface portion of said supporting element to seat said second arm portion for limited rocking motion of said brake band member thereon.

17. In a machine having a frame, a rotating member rotatably supported on said frame, and an assembly for intermittently applying a braking force to said rotating member, the improvement wherein said assembly comprises: a brake drum member and a cam member adjacently disposed on said rotating member for rotation therewith, said cam member having a peripheral portion providing a continuous camming surface extending about its axis of rotation, and having a return cam element projecting from one side thereof; a brake band member having an encircling portion substantially encircling said brake drum member, with a cylindrical inside surface confronting the outside surface of said drum member and adapted to apply a braking force thereto, said encircling portion being resiliently deflectable from a relatively relaxed condition to a stressed condition, and being dimensioned to dispose said inside surface out of substantial contact with said outside surface in said relaxed condition and to frictionally engage said outside surface in said stressed condition to apply braking force thereto; an actuating arm having means mounting it for pivotal movement about an axis parallel to said axis of rotation for cooperation with said cam member, and having force-transmitting means thereon, said arm also having a first portion, and a cam follower element disposed thereon for operative engagement with said camming surface of said cam member, and having a camming surface component disposed by said cam element on said cam member, for operative engagement thereby; and means operatively connecting said force-transmitting means of said arm to said encircling portion of said brake band member fo effecting deflection thereof, said camming surface having a first portion configured to position said arm, acting through said follower element, said force-transmitting means and said connecting means, in a first orientation during one phase of the cycle of rotation of said cam member, to deflect said encircling portion of said brake band member to said relatively stressed condition, and having a second portion configured to position said arm, during another phase of the cycle of rotation of said cam member, in a second orientation at which said brake band member is in said relatively relaxed condition, said camming surface component of said actuating arm being adapted to interengage with said cam element at substantially the same time that said cam follower resides at the point of transition from said first camming surface portion of said cam member to said second portion thereof, to effect the positive return of said arm to said first position thereof.

18. The machine of claim 17 wherein said assembly additionally includes a supporting member affixed to said frame and so mounting said actuating arm thereon.

19. The machine of claim 18 wherein said encircling portion of said brake band member is of split ring form, with adjacent free ends, and includes an arm portion extending from one of said free ends, said arm portion having an element thereon which is adapted for supporting said brake band member in a substantially fixed position against rotation about said first-mentioned axis under the influence of braking force applied to said connecting means, said supporting member also serving to receive said supporting element of said arm portion for so supporting said brake band member.

20. An automatic brake assembly for intermittently applying braking force to a rotating member, and for relieving such force therefrom, comprising: a brake drum member and a cam member adapted to be adjacently disposed on a rotating member for rotation therewith, said cam member having a peripheral portion providing a continuous camming surface extending about its axis of rotation, and having a return cam element projecting from one side thereof; a brake band member having an encircling portion adapted to substantially encircle said brake drum member, with a cylindrical inside surface for contacting the outside surface of said drum member to apply a braking force thereto, said encircling portion being resiliently deflectable from a relatively relaxed condition to a stressed condition, and being dimensioned to dispose said inside surface out of substantial contact with said outside surface in said relaxed condition and to frictionally engage said outside surface in said stressed condition to apply braking force thereto, said brake band member having a resiliently deflectable encircling portion of split-ring form, defining a generally cylindrical opening and being adapted to substantially encircle a cylindrical part for the application of frictional force thereto, said encircling portion having proximate free ends that are spaced from one another, and having a flexure section disposed generally diametrically with respect to said free ends and being of reduced effective thickness, with respect to the remainder of said encircling portion, said member having means for the receipt and transmission of applied force for the deflection of said encircling portion, such deflection occurring substantially wholly by flexure in said flexure section; an actuating arm having means for mounting it for pivotal movement about an axis parallel to said axis of rotation for cooperation with said cam member, and having forcetransmitting means thereon, said arm also having a first portion, and a cam follower element carried thereon and adapted for operative engagement with said camming surface of said cam member when so mounted, and having a camming surface component adapted for operative engagement by said return cam element of said cam member; and means for operatively connecting said forcetransmitting means of said arm to said encircling portion of said brake band member for effecting deflection thereof, said camming surface having a first portion configured to position said arm, acting through said follower element, said force-transmitting means and said connecting means, in a first orientation during one phase of the cycle of rotation of said cam member, to deflect said encircling portion of said brake band member to said relatively stressed condition, and having a second portion configured to position said arm, during another phase of the cycle of rotation of said cam member, in a second orientation at which said brake band member is in said relatively relaxed condition, said camming surface component of said actuating arm being disposed along the path of rotation of said return cam element of said cam member, and being adapted to interengage therewith at substantially the same time that said cam follower resides at the point of transition from said first camming surface portion of said cam member to said second portion thereof, to effect the positive return of said arm to said first position thereof.

* * * * *